United States Patent
Lewis

(12) 
(10) Patent No.: US 6,327,738 B1
(45) Date of Patent: Dec. 11, 2001

(54) WINDSHIELD WIPER BOOT

(76) Inventor: Jeffrey S. Lewis, 50 Hunt Rd., Columbia, CT (US) 06237

( * ) Notice: Subject to any disclaimer, the term of this patent is extended or adjusted under 35 U.S.C. 154(b) by 0 days.

(21) Appl. No.: 09/745,234

(22) Filed: Dec. 20, 2000

Related U.S. Application Data

(60) Provisional application No. 60/172,755, filed on Dec. 20, 1999.

(51) Int. Cl.$^7$ ...................................................... B60S 1/04
(52) U.S. Cl. .................................. 15/250.001; 15/257.01; 150/154
(58) Field of Search ....................... 15/250.361, 250.001, 15/250.48, 250.19, 247, 257.01, 250.4, 250.41; 150/155–166, 154

(56) References Cited

U.S. PATENT DOCUMENTS

| | | | |
|---|---|---|---|
| 2,141,023 | * 12/1938 | Ryan | 15/250.001 |
| 3,199,563 | * 8/1965 | Forrest | 15/250.001 |
| 4,363,317 | * 12/1982 | Broucek | |
| 5,403,009 | * 4/1995 | Gleason | 150/160 |
| 5,634,841 | * 6/1997 | Gold | 15/250.41 |
| 5,687,773 | * 11/1997 | Ryan et al. | |
| 6,070,287 | * 6/2000 | Kornegay | 15/250.001 |
| 6,095,214 | * 8/2000 | Gaffney | 150/160 |

FOREIGN PATENT DOCUMENTS

| | | | |
|---|---|---|---|
| 588368 | * 5/1977 | (CH) | 15/250.361 |
| 2517489 | * 10/1976 | (DE) | 15/250.361 |

* cited by examiner

*Primary Examiner*—Gary K. Graham
(74) *Attorney, Agent, or Firm*—McCormick, Paulding & Huber LLP

(57) ABSTRACT

A windshield wiper boot for protecting a windshield wiper and wiper arm. The windshield wiper boot including a body portion having a hollow interior portion sized to fit over a portion of the windshield wiper and a portion of the wiper arm. The boot also includes a closed distal end and an open distal end sized to slidably fit over the portion of the windshield wiper and the portion of the wiper arm.

6 Claims, 1 Drawing Sheet

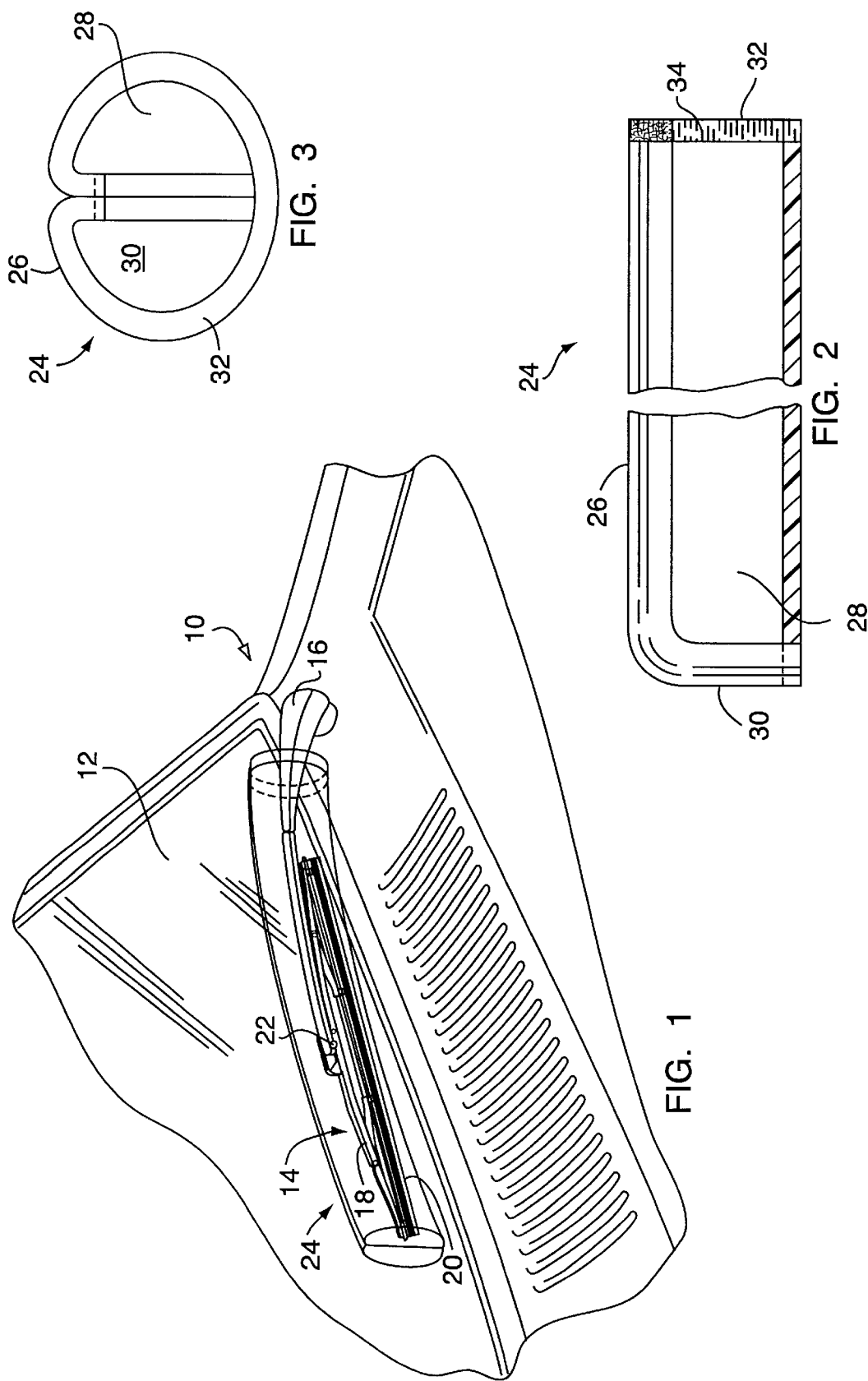

WINDSHIELD WIPER BOOT

CROSS-REFERENCE TO RELATED APPLICATION

This application claims priority to the Provisional Application which was filed on Dec. 20, 1999, as application Ser. No. 60/172,755 and titled Windshield Wiper Boot.

FIELD OF THE INVENTION

The present invention relates to windshield wipers such as used on motor vehicles and, more particularly, pertains to a protective boot which may be fittingly secured over the windshield wiper and most of the arm upon which the wiper is supported.

BACKGROUND OF THE INVENTION

Windshield wipers tend to wear out quickly, as well as become embittered with age. These wear and embrittlement problems usually result in wiper blades losing their effectiveness. Specifically, the wiper blades lose much of their flexibility so that only portions of the blades make contact with a windshield during a wiping operation. This results in streaks and dirt accumulation on the windshield which severely affects visibility.

In an attempt to overcome the problems of wear and embrittlement, a number of different types of windshield wipers have been designed. Many of these windshield wipers comprise spring-like flexural members attached to the wiper blades so that some of the wear and embrittlement may be offset through a biasing force provided by these flexural members. However, snow, dirt and other materials may accumulate about the flexural members and completely destroy their effectiveness. In this regard, accumulated snow often turns to ice which may cause the flexural members to temporarily warp out of shape, thereby pulling portions of a wiper blade completely away from a windshield. The use of these flexural members in snow climates has presented new problems associated with attempts to keep wiper blades in contact with the windshield at all times, while at the same time doing little to eliminate the problems of wear and embrittlement.

The general movement of the industry has been towards the design of windshield wipers which have quickly, removable, replaceable wiper blades. Basically, the industry's solution to the problems of wear, embrittlement and material accumulation in the flexural members has been simply to frequently replace the wiper blades. However, through the use of the present invention, the problems associated with wear, embrittlement and material accumulation are substantially reduced.

SUMMARY OF THE INVENTION

The general purpose of the present invention, which will be described subsequently in greater detail, is to provide a windshield wiper boot that eliminates many of the problems which interfere with the effectiveness of windshield wipers. To attain this, the present invention utilizes a vinyl boot positional over all of the structural components of a windshield wiper and arm, so as to protect the flexural members and attached wiper blades from the outside environment when the vehicle is not in use.

The boot prevents snow and other material from accumulating around the flexural member, so that once the boot is removed, a continual positioning of a wiper blade in a close conforming contact with a windshield is possible. Additionally, the boot substantially protects the blade itself from the environment so as to reduce problems associated with wear and aging resulting in embrittlement.

It is, therefore, an object of the present invention to provide protection means for a windshield wiper.

It is another object of the present invention to provide a cover for a windshield wiper and arm which is effective in preventing the accumulation of snow, ice and other material about the flexural member and blade portion of the windshield wiper and around that portion of the arm which overlaps with the windshield wiper.

It is a further object of the present invention to provide a cover for a windshield wiper and arm which is effective in reducing the wear on the flexural member of the windshield wiper.

Still another object of the present invention is to provide a cover for a windshield wiper which substantially reduces the aging and attendant embrittlement of a wiper blade.

Still another object of the present invention is to provide a cover for a windshield wiper which may be economically and easily manufactured.

These, together with other objects and advantages which will become subsequently apparent, reside in the details of construction and operation as more fully described and claimed, reference being had to the accompanying drawings forming a part hereof, wherein like numerals refer to like parts throughout.

BRIEF DESCRIPTION OF THE DRAWINGS

FIG. 1 is a perspective view of a windshield wiper boot in accordance with the present invention installed on a motor vehicle;

FIG. 2 is a cross-sectional view of the boot of FIG. 1.

FIG. 3 is a rear view of the windshield wiper boot looking into the opening to show the sewn portions of the body disposed therein.

DETAILED DESCRIPTION OF THE PREFERRED EMBODIMENT

Referring to FIG. 1, an exemplary embodiment of the present invention is illustrated, wherein a motor vehicle 10 has a windshield 12 over which is disposed a slidably, movable windshield wiper 14 attached to a wiper arm 16. The windshield wiper 14 comprises a spring-like flexural member 18 attached to a wiper blade 20. The windshield wiper 14 is connected at its mid-section to the distal end of a wiper arm 16 via removable connector 22. The flexural member 18 biases the wiper blade 20 against the windshield 12 to help offset wear and embrittlement of the blade 20.

A windshield wiper boot 24, in accordance with the present invention, provides a protective cover for the windshield wiper 14 and arm 16. The boot 24 substantially prevents the accumulation of ice, snow and other materials about the flexural member 18 and wiper blade 20 of the windshield wiper 14. The boot 24 also covers that portion of the arm 16 which overlaps with the windshield wiper 14.

Referring to FIG. 2, the windshield wiper boot 24 has a body portion 26 constructed of waterproof or water-resistant material, e.g., vinyl, or nylon, which is sized to fit over and enclose the windshield wiper 14 and arm 16. The body portion 26 is sewn together from the outside and subsequently pulled inside out so that the sewn portions (best seen in FIG. 3) are disposed entirely within the interior portion 28 of the boot 24. Though this embodiment describes a sewn boot, it will be appreciated that other methods of manufacturing the boot may also be used, e.g., one-piece molding.

The body portion 26 of the boot 24 has a closed distal end 30 and an open distal end 32. The open distal end 32 is sized to slidably fit over the windshield wiper 14 and arm 16. A hook and loop fastener 34 is disposed on the open distal end 32 to close the open end 32 around the wiper arm 16, thus effectively enclosing and protecting the entire windshield wiper 14 within the interior portion 28 of the boot 24. Though a hook-and-loop fastener 34 is described in this embodiment, it will be appreciated that other fasteners may also be used, e.g., string, elastic, snaps or zippers.

As can be appreciated, most of the structural configuration of the windshield wiper 14 and arm 16 are protected from the outside environment by the boot 24. This prevents the accumulation of snow and other materials around the flexural member 18, which might otherwise limit the ability to conform to the shape of the windshield 12. The wiper boot 24 is removed and replaced back over the windshield wiper 14 simply by opening and closing the open end 32 with the hook-and-loop fastener 34.

With respect to the above description, it should be realized that the optimum dimensional relationship for the parts of the invention are deemed readily apparent and obvious to one skilled in the art, and all equivalent relationships to those illustrated in the drawings and described in the specification, are considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. In a windshield wiper assembly which includes a wiper arm pivotally mounted proximate a vehicle windshield, the wiper arm supporting a windshield wiper, wherein part of the wiper arm and the whole of the windshield wiper are enclosed by a wiper boot, the wiper boot comprising:

a body portion, constructed of a water resistant material, having a hollow interior sized for receiving the windshield wiper attached to the wiper arm, the body portion having a length greater than the overall length of the windshield wiper and less than the over all length of the windshield wiper assembly;

a closed distal end;

an open distal end defining an opening sized to slidably receive the windshield wiper into the hollow interior with the attached wiper arm extending through the opening;

a fastening means disposed on the open distal end which engages and closes around the wiper arm; and wherein the combination of the water resistant material and fastening means engaging the wiper arm substantially prevents the accumulation of ice and snow about the windshield wiper.

2. The windshield wiper boot of claim 1 wherein the fastening means comprises hook and loop fasteners.

3. The windshield wiper boot of claim 1 wherein the fastening means further comprises one of a string, elastic, snap and zipper.

4. The windshield wiper boot of claim 1 wherein the water resistant material is composed substantially of vinyl.

5. The windshield wiper boot of claim 1 wherein the water resistant material is composed substantially of nylon.

6. The windshield wiper boot of claim 1 wherein the body portion further comprises a sewn body portion having sewn portions disposed entirely within the interior portion of the boot.

* * * * *